(12) United States Patent
Ward et al.

(10) Patent No.: US 11,536,409 B2
(45) Date of Patent: Dec. 27, 2022

(54) HEATED CONNECTOR ASSEMBLY

(71) Applicant: Norma U.S. Holding LLC, Auburn Hills, MI (US)

(72) Inventors: Nicholas Ward, Ft. Gratiot, MI (US); Brian Ignaczak, Rochester, MI (US); Glenn Moore, Kimball, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 77 days.

(21) Appl. No.: 17/126,736

(22) Filed: Dec. 18, 2020

(65) Prior Publication Data

US 2021/0102653 A1 Apr. 8, 2021

Related U.S. Application Data

(62) Division of application No. 15/212,609, filed on Jul. 18, 2016, now abandoned.

(51) Int. Cl.
*F16L 53/38* (2018.01)
*F16L 43/00* (2006.01)

(52) U.S. Cl.
CPC .............. *F16L 53/38* (2018.01); *F16L 43/00* (2013.01)

(58) Field of Classification Search
CPC ........................................................ F16L 53/38
USPC ............................................ 285/41; 392/480
See application file for complete search history.

(56) References Cited

U.S. PATENT DOCUMENTS 8,238,733 B2 * 8/2012 Sawada ................... F16L 53/38
2012/0291904 A1 11/2012 Eckardt et al.

FOREIGN PATENT DOCUMENTS

CA 2019590 A1 12/1991
WO WO2013083274 A1 6/2013

OTHER PUBLICATIONS

Mexican Office Action for Mexican Application No. MX/a/2016/009408 dated Jul. 29, 2020 (5 pages).
Indian Examination Report for Indian Application No. 201614024724 dated Aug. 31, 2020 (7 pages).
Mexican Office Action for Mexican Application No. MX/a/2016/009408 dated Mar. 31, 2021 (5 pages).

* cited by examiner

*Primary Examiner* — Zachary T Dragicevich
(74) *Attorney, Agent, or Firm* — Reising Ethington, P.C.

(57) ABSTRACT

A connector assembly has a connector body to receive a spigot. The connector body includes a mechanism to retain the spigot in the connector body. A fluid transfer conduit is coupled with the connector body. A heating element extends through the fluid transfer conduit and into the connector body and spigot, when the spigot is retained by the connector body. The heating element heats the spigot and the connector body from the inside.

6 Claims, 6 Drawing Sheets

HEATED CONNECTOR ASSEMBLY

CROSS-REFERENCE TO RELATED APPLICATION

This application is a divisional of U.S. patent application Ser. No. 15/212,609, filed Jul. 18, 2016, now abandoned, which claims the benefit of U.S. Provisional Patent Application No. 62/194,434, filed Jul. 20, 2015.

TECHNICAL FIELD

The present disclosure relates to a quick connector assembly and, more particularly, to a quick connector assembly with a heated connector body.

BACKGROUND

In the automobile industry, various types of quick connectors are utilized to connect ends of conduits with various elements. In some instances, heated conduit lines are desirable. In these cases, the fluid in the conduits freezes at ambient temperatures. In environments such as water lines for windshield wiper washing systems and urea solutions lines that are used in a NO reduction additives for diesel engines with SCRS catalytic converters, these types of heated conduits are desirable. Thus, it is desirable to provide a quick connector that is heatable to warm the distribution element or spigot. The present disclosure provides the art with a quick connector assembly that enables heating of the quick connector body and spigot.

The present disclosure enables the quick connector body and spigot to be heated from the inside of the connector assembly. The present disclosure provides for the power connection to be made with the connector assembly.

SUMMARY

In an embodiment, a quick connector assembly may include a connector body, a fluid transfer conduit, and a heating wire. The connector body has a mechanism to retain a spigot in the connector body. The fluid transfer conduit is coupled with the connector body. The heating wire extends through the connector body and passes through the fluid transfer conduit. The heating wire heats the connector body and the spigot from inside of the connector body and from inside of the spigot. The heating wire includes a first heating wire portion and a second heating wire portion. The first heating wire portion exits the connector body by way of a first projection. The second heating wire portion exits the connector body by way of a second projection.

In another embodiment, a quick connector assembly may include a connector body, a fluid transfer conduit, a heating wire, and a housing. The fluid transfer conduit is coupled with the connector body. The heating wire extends through the connector body and passes through the fluid transfer conduit. The heating wire heats the connector body from inside of the connector body. The heating wire includes a first heating wire portion and a second heating wire portion. The housing surrounds a portion or more of the connector body. The housing has a head portion and has a bump. The head portion provides space for the first heating wire portion, and the bump provides space for the second heating wire portion.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
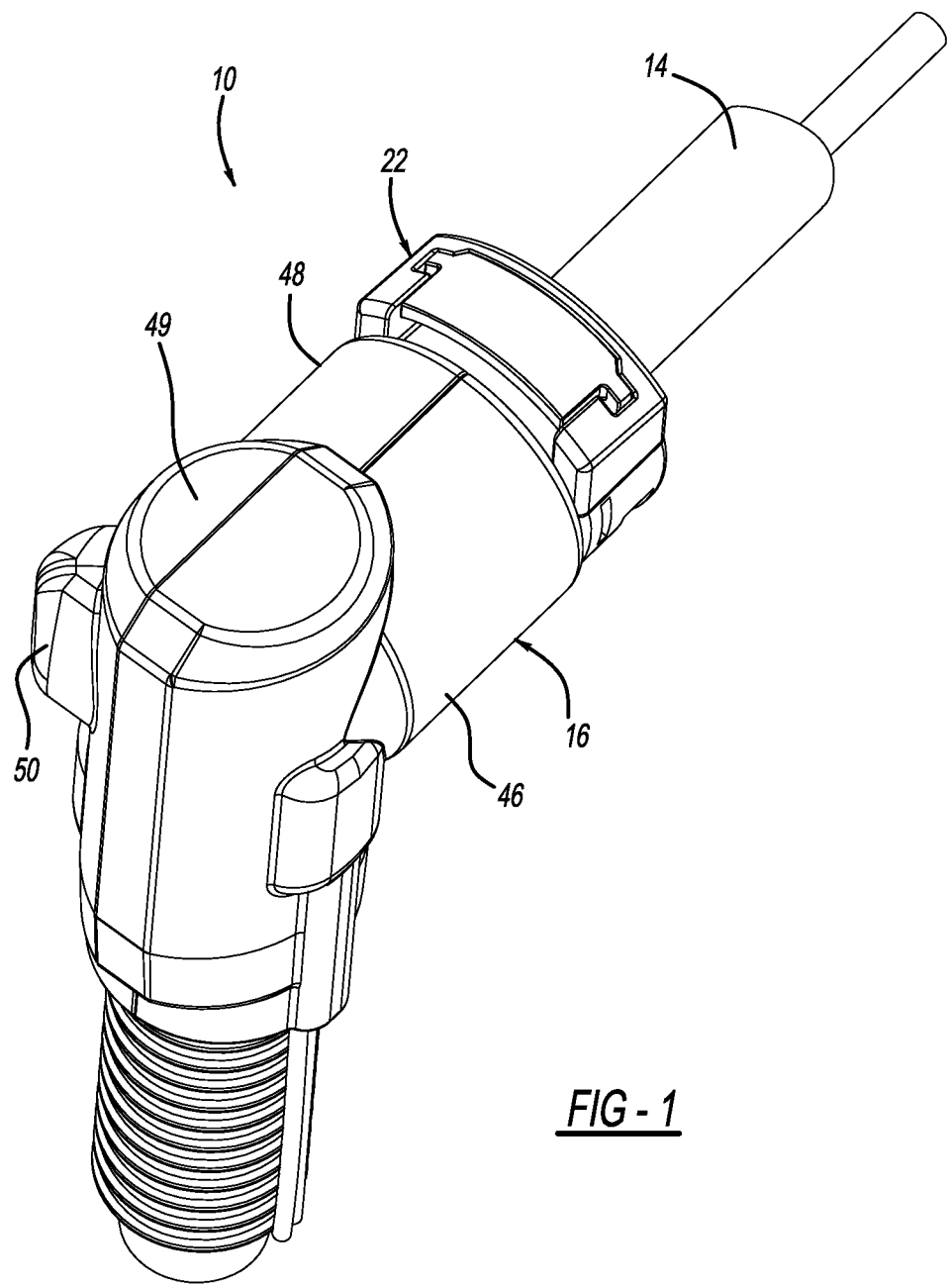
FIG. 1 is a perspective view of a connector assembly in accordance with the disclosure.

Example embodiments will now be described more fully with reference to the accompanying drawings.

Turning to the figures, a connector assembly is illustrated and designated with the reference numeral 10. The connector assembly includes a connector body 12 and a spigot 14 received in the connector body 12. A housing 16 covers a portion of the connector body 12. An end 18 of the connector body 12 is connected, via clamp 19, with a fluid transfer conduit 20. A heat wire 30 is passed through the fluid transfer conduit 20 and the connector assembly 10.

The connector body 12 includes a mechanism 22 to retain the spigot 14 in the connector body. Seals 24 are present to seal the spigot inside the connector body 12. The spigot 14 may be connected to a conduit line, nozzle or the like. The connector body 12 has an L-shape. The heating wire 30 extends through the connector body 12 and into the spigot 14. The end 28 of the heating wire extends beyond the free connector end 26 of the connector body 12. Thus, the heating wire 30 heats the connector body 12 and the spigot 14 from inside of the connector assembly 10.

Figure 2:
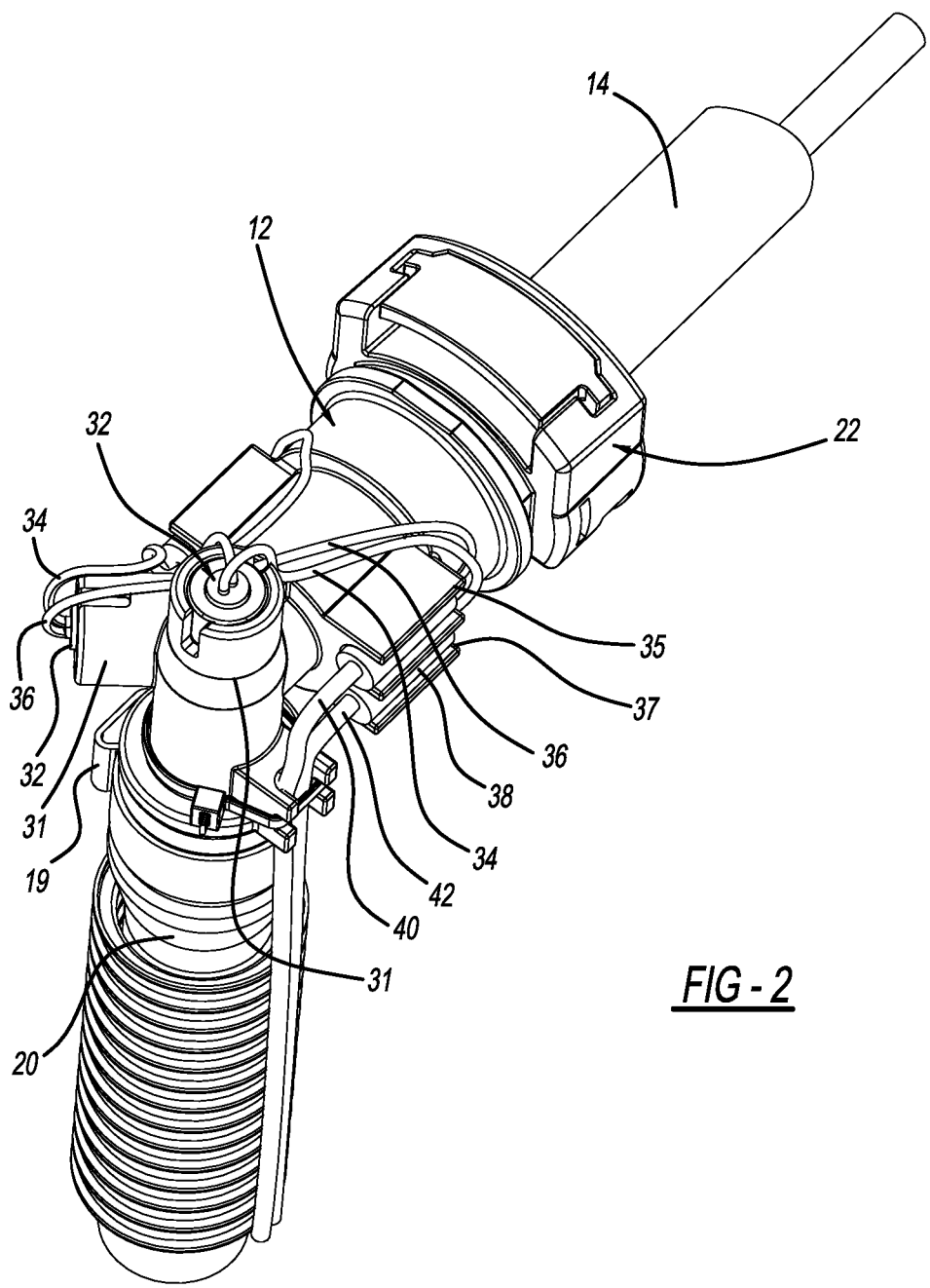
FIG. 2 is a view like FIG. 1 with a portion of the housing removed.
Figure 3:
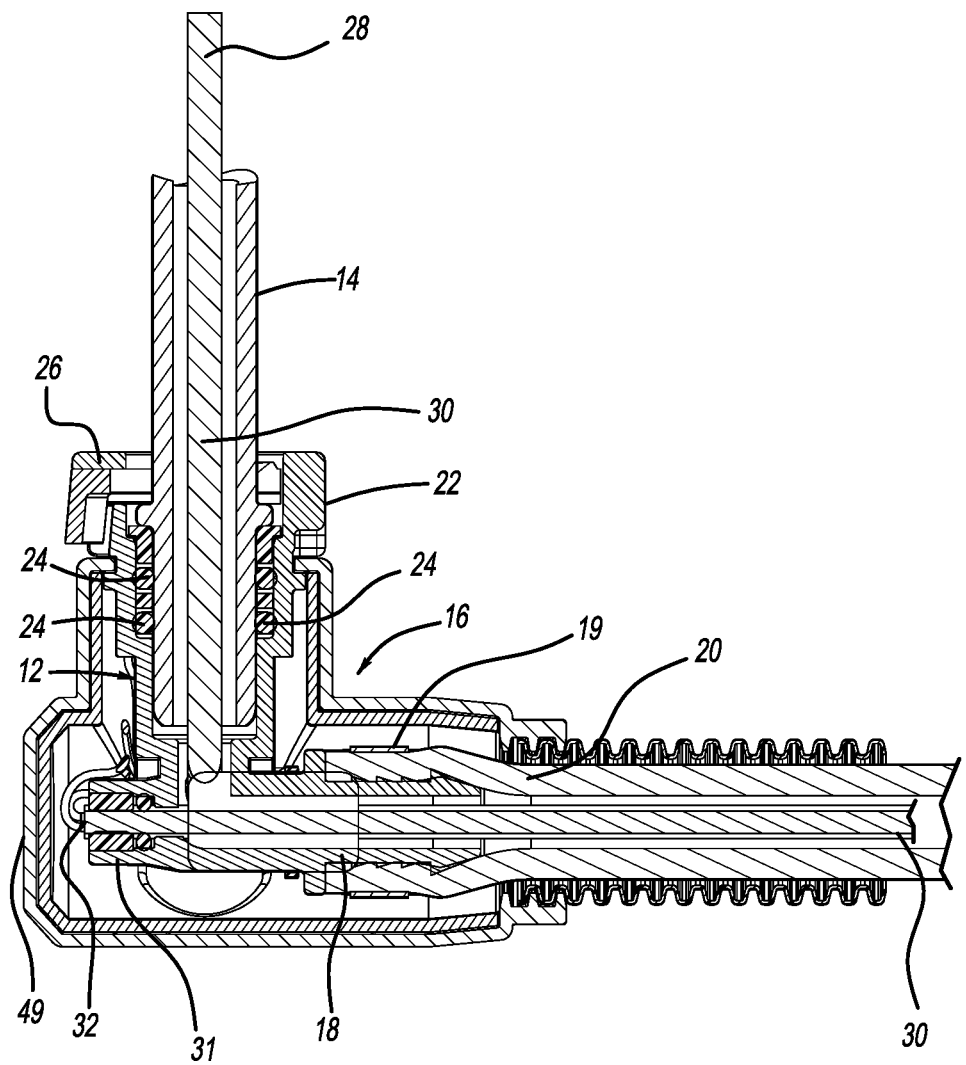
FIG. 3 is a cross-sectional view of the connector assembly of FIG. 1.

A portion 32 of the heating wire 30 exits the connector body 12 via projections 31. As can be seen in FIGS. 2 and 3, two portions 32 exit the connector body 12. The portions 32 could be adjacent one another. Each portion 32 has wires 34, 36 that are secured with the connector body 12. The wires 34, 36 may be secured in channels 35, 37. The channels 35, 37 receive connector 38 that enables the wires 34, 36 to be connected with one another or with wires 40, 42 that are connected with an electrical power source (not shown). Additionally, the wires and connections 38 may provide additional resistance heating.

The housing 16 is of asymmetric clam shell design. The housing 16 includes two halves 46, 48. The half 46 covers a portion of the connector body 12. The half 48 covers the remaining portion of the connector body 12. The housing 46, 48 come together to form a head portion 49. The head portion 49 provides space for one of the connector projectors 31 and wire end portions 32. The housing 48 also includes a bump 50 that provides space for the other connector projection 31 and end portion 32 of the heating wire 30. Thus, the housing 16 covers the connector body 12, wires 34, 36 and electrical connectors 38. The fluid transfer conduit 20 generally will include a pair of connector assemblies 10, one on each end of the conduit 20. Thus, only one has been illustrated.

Figure 4:
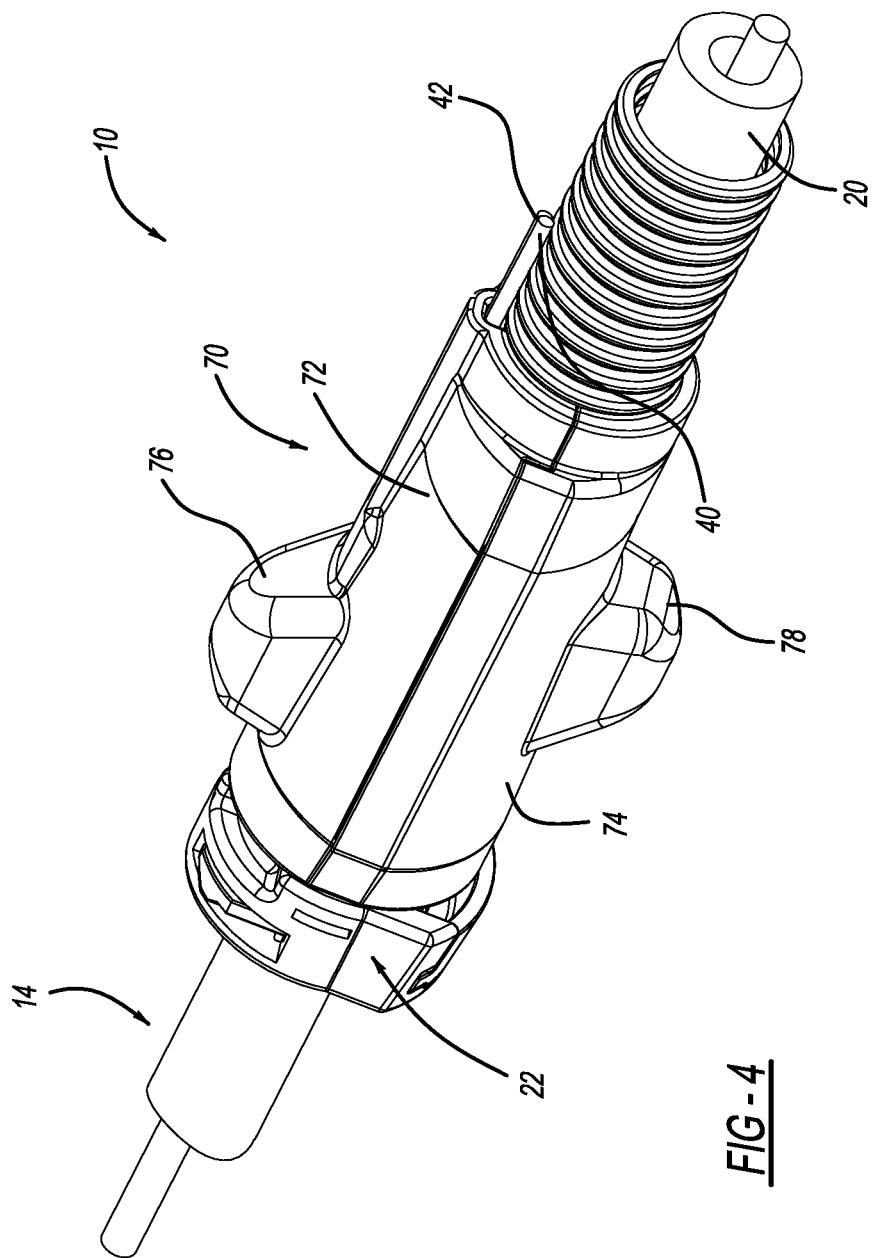
FIG. 4 is a perspective view of another embodiment.
Figure 5:
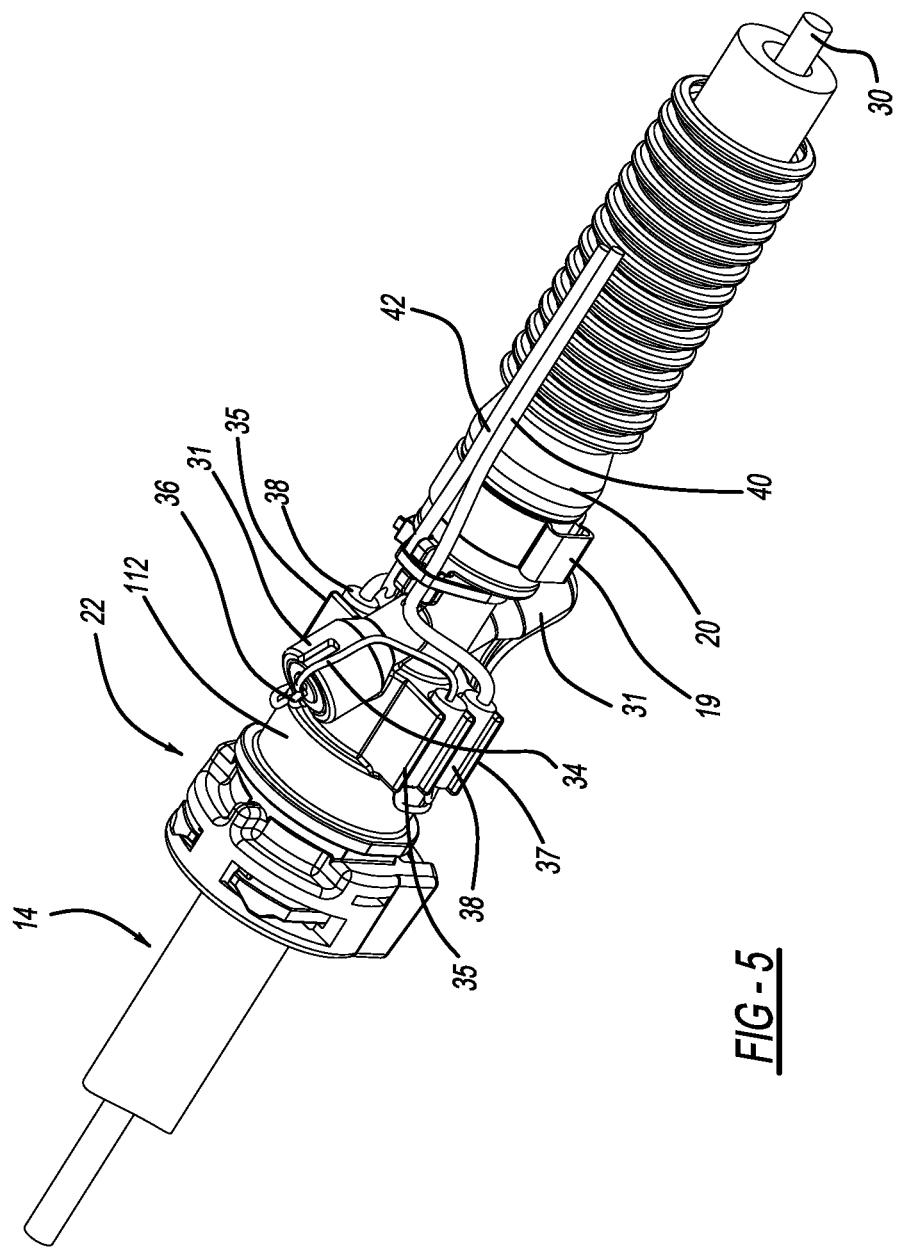
FIG. 5 is a view like FIG. 4 with a portion of the housing removed.
Figure 6:
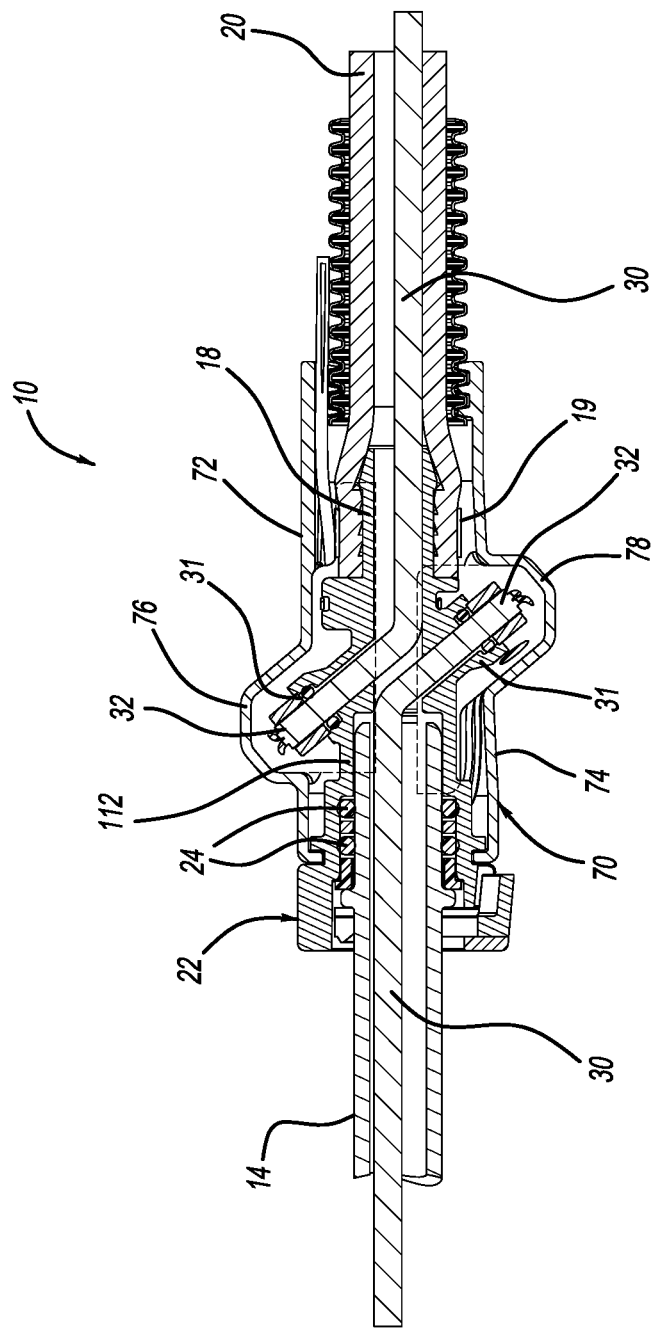
FIG. 6 is a cross-sectional view of the connector assembly of FIG. 4.

Turning to FIGS. 4-6, an additional embodiment is shown. The embodiment in FIGS. 4-6 differs from that in FIGS. 1-3 in that the connector body 112 is straight or axial and not L-shaped as in FIG. 1. Accordingly, the same reference numerals that have been utilized in the first embodiment will be utilized in the second embodiment. The housing 70, surrounding the connector body 112, has a clam shell design with two halves 72, 74. Both halves 72, 74 include a bump 76, 78 that provides space for the housing projections 31 and the end portion 32 of the heating wire 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A quick connector assembly, comprising:
   a connector body having a mechanism to retain a spigot in said connector body;
   a fluid transfer conduit coupled with said connector body; and
   a heating wire extending through said connector body and passing through said fluid transfer conduit, said heating wire heating said connector body and the spigot from inside of said connector body and the spigot, wherein said heating wire includes a first heating wire portion and a second heating wire portion, said first heating wire portion exiting said connector body via a first projection, and said second heating wire portion exiting said connector body via a second projection, wherein said first heating wire portion has a first plurality of wires secured with said connector body, and said second heating wire portion has a second plurality of wires secured with said connector body, wherein said first plurality of wires are secured in first channels, and said second plurality of wires are secured in second channels, wherein said first channels receive a first connector enabling connection of said first plurality of wires, and said second channels receive a second connector enabling connection of said second plurality of wires, and wherein said first connector and said first plurality of wires provide resistance heating, and said second connector and said second plurality of wires provide resistance heating.

2. The quick connector assembly as set forth in claim 1, wherein an end of said heating wire extends beyond a free connector end of said connector body.

3. The quick connector assembly as set forth in claim 1, further comprising a housing surrounding at least a portion of said connector body, said housing having a head portion and a bump, said head portion providing space for said first heating wire portion and said first projection, and said bump providing space for said second heating wire portion and said second projection.

4. A quick connector assembly, comprising:
   a connector body;
   a fluid transfer conduit coupled with said connector body;
   a heating wire extending through said connector body and passing through said fluid transfer conduit, said heating wire heating said connector body from inside of said connector body, wherein said heating wire includes a first heating wire portion and a second heating wire portion, wherein said first heating wire portion has a first plurality of wires secured with said connector body, and said second heating wire portion has a second plurality of wires secured with said connector body, wherein said first plurality of wires are secured in first channels, and said second plurality of wires are secured in second channels, wherein said first channels receive a first connector enabling connection of said first plurality of wires, and said second channels receive a second connector enabling connection of said second plurality of wires, wherein said first connector and said first plurality of wires provide resistance heating, and said second connector and said second plurality of wires provide resistance heating; and
   a housing surrounding at least a portion of said connector body, said housing having a head portion and a bump, said head portion providing space for said first heating wire portion, and said bump providing space for said second heating wire portion.

5. The quick connector assembly as set forth in claim 4, wherein said first heating wire portion exits said connector body via a first projection, and said second heating wire portion exits said connector body via a second projection.

6. The quick connector assembly as set forth in claim 4, wherein an end of said heating wire extends beyond a free connector end of said connector body.

* * * * *